United States Patent [19]

Franklin

[11] 4,337,555
[45] Jul. 6, 1982

[54] WIRE GRIPPING DEVICE

[76] Inventor: Peter J. Franklin, 49 Meeanee Rd., Taradale, Hawkes Bay, New Zealand

[21] Appl. No.: 141,637

[22] Filed: Apr. 18, 1980

[30] Foreign Application Priority Data

Apr. 19, 1979 [NZ] New Zealand .................. 190226

[51] Int. Cl.³ .................. F16G 11/04; B25G 3/20
[52] U.S. Cl. .................. 24/249 R; 403/374
[58] Field of Search ........ 24/249 R, 249 SL, 249 DP, 24/251, 357 R, 354, 360; 248/113, 316 A, 316 E; 403/105, 374

[56] References Cited

U.S. PATENT DOCUMENTS

| | | | |
|---|---|---|---|
| 2,272,494 | 2/1942 | Winslow | 24/134 R |
| 2,346,859 | 4/1944 | Mills | 24/249 R |
| 2,348,618 | 5/1944 | Gordon | 24/249 R X |
| 2,978,768 | 4/1961 | Heapy | 24/134 R |
| 3,156,963 | 11/1964 | Owen | 24/249 R |
| 3,170,664 | 2/1965 | Carner | 24/249 R X |
| 4,057,878 | 11/1977 | Kaye | 403/374 X |

FOREIGN PATENT DOCUMENTS

| | | | |
|---|---|---|---|
| 247405 | 12/1947 | Switzerland | 24/249 R |
| 471743 | 6/1969 | Switzerland | 403/105 |

*Primary Examiner*—Dennis L. Taylor
*Attorney, Agent, or Firm*—Young & Thompson

[57] ABSTRACT

A wire gripping device which comprises a body having an internal cavity. There is at least one opening into the cavity whereby a portion of a wire member can be located within the cavity. Inside the cavity there is at least one wire engaging member which is positioned therein by resilient means. The wire engaging member has a wire engaging surface which is located adjacent to but spaced from a fixed surface within the cavity so that a wire member can be moved longitudinally into the cavity in one direction but is prevented from being removed by the engaging member wedging the wire member between the engaging surface and the fixed surface.

11 Claims, 10 Drawing Figures

WIRE GRIPPING DEVICE

This invention relates to a wire gripping device.

There are many applications for a device which may be used to grip a length of wire. For example in wire fence lines it is often necessary to be able to join the ends of two lengths of wire. One method of connecting the ends is by twisting or crimping them together. This method is widely used and whilst it is effective it does involve time and in the case of crimping can involve specialised tools. In addition, and more particularly with the twisting together of the wire ends, unwanted stresses can be set up in the wire once it had been strained with resultant failure of the join. Further, the join once formed is difficult to release.

In other applications such as in vineyards it is often necessary to be able to grip the end of a wire so that the said end can be anchored. Once again the fastening can be carried out by the wire end being passed through a locating point and then twisted or crimped back upon itself. The problems which are mentioned above can once more arise.

The object of the present invention is thus to provide a wire gripping device having such a construction that a length of wire can be quickly and conveniently engaged and firmly retained in the device.

A further object of the invention is to provide a wire gripping device whereby the wire can be released from the device if required.

In its broadest aspect the invention provides a wire gripping device comprising a body, an internal cavity with inset body, an opening into said cavity whereby a portion of a wire member can locate within said cavity, at least one wire engaging member located within said cavity, resilient means which position said wire engaging member within the cavity such that a wire engaging surface of the wire engaging member is located adjacent to, but spaced from, a fixed surface so that a wire member can be moved longitudinally into said cavity in one direction but is prevented from being removed by said wire engaging member wedging the wire member between the wire engaging surface and said fixed surface.

In its preferred form the device has a plurality of wire engaging members which is suspended in the cavity with the members being spaced apart from each other and the fixed surface by the resilient means. The wire engaging members can be of flat elongate shape and are located in a parallel spaced apart array by a resilient spacer member located between and coupling each pair of adjacent engaging members, the engaging member at each end of the array being coupled to a wall surface of the cavity by a resilient spacer member. In this form the wire engaging surface is formed by the edge of one short side of the elongate wire engaging member. The wire engaging surface can be provided with a gripping surface such as for example one or more longitudinal ridges. The wire engaging surface can also be formed as a curved recess.

In a further form of the invention the body can include two cavities located side by side with each of the cavities however being a spacial array of the wire engaging members. Alternatively each of the wire engaging members can have a pair of wire engaging surfaces which locate opposite a fixed surface.

The resilient spacer members can be formed of a suitable rubber or plastics material. In a preferred form each resilient spacer member is of disc shape and is adhered to a face surface of the elongate member.

In more fully describing the invention reference will be made to the accompanying drawings in which.

Figure 1:
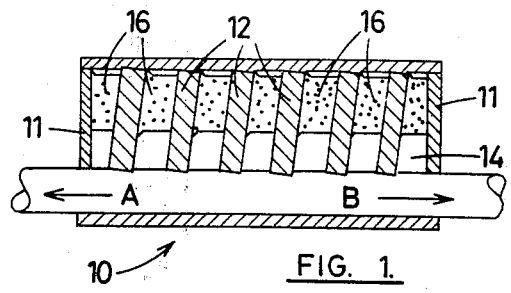
FIG. 1 is a sectional elevation of one form of the invention.
Figure 3:
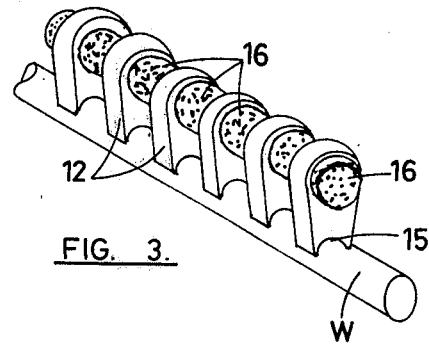
Figure 4:
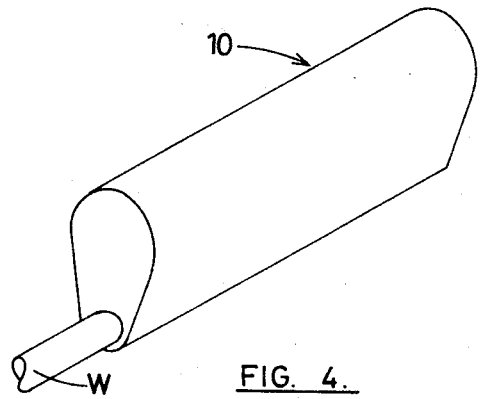
Figure 5:
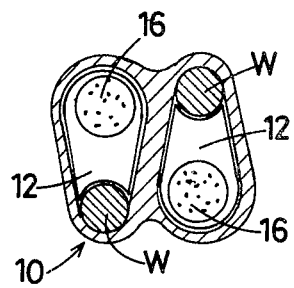
Figure 6:
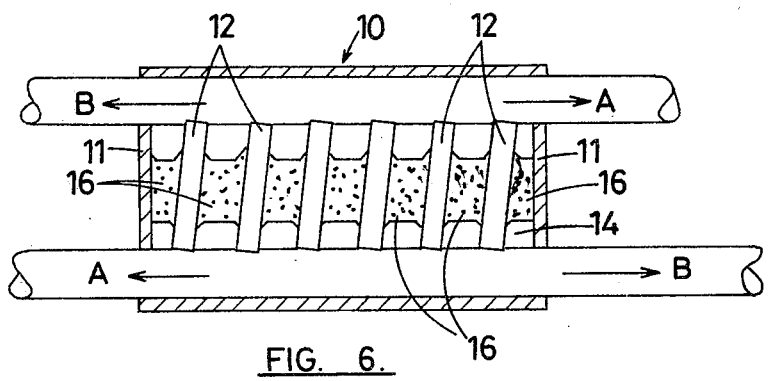
Figure 7:
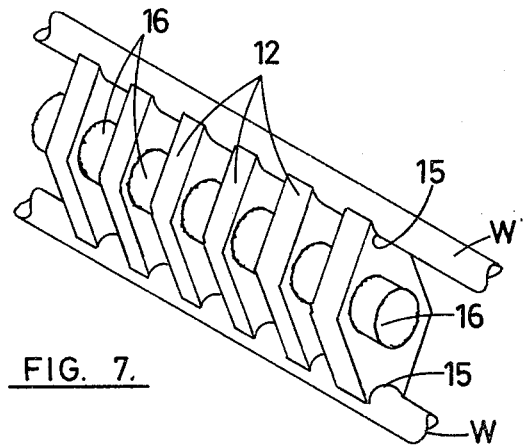
Figure 8:
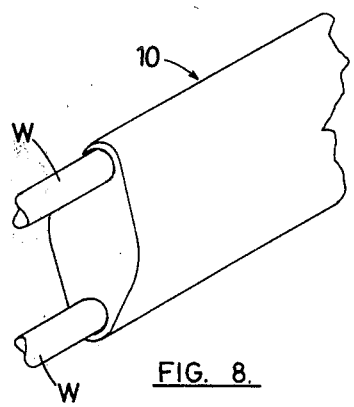
Figure 9:
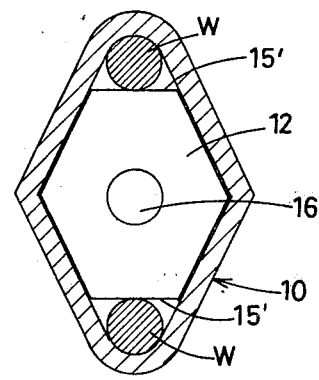
Figure 10:
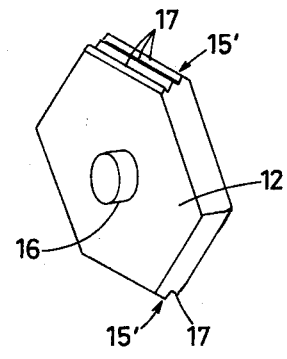

FIG. 3 is a perspective view of the wire engaging members of the form illustrated in FIG. 1, FIG. 4 is a perspective view of the device as shown in FIG. 1, FIG. 5 is a sectional end view of a second form of the invention, FIG. 6 is a sectional elevation view of a third form of the invention, FIG. 7 is a perspective view similar to FIG. 3 but showing the form of the invention illustrated in FIG. 6, FIG. 8 is a perspective view of the form of the invention illustrated in FIG. 6, FIG. 9 is a sectioned end view of a fourth view of the invention, and FIG. 10 is a perspective view of a wire engaging member used in the form of the invention shown in FIG. 9.

Figure 2:
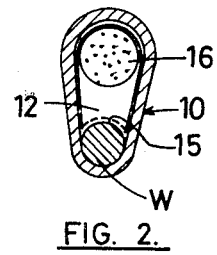
FIG. 2 is a sectioned end view of the arrangement shown in FIG. 1.

The body 10 of the device is essentially tubular and referring to the first form of the invention preferably has a shape which is more clearly illustrated in FIGS. 2 and 4. The body can be of any suitable construction such as being fabricated from sheet steel or formed as an extrusion. The diameter of the lower wire receiving portion of body 10 is such as to accommodate the diameter of the wire which is to be gripped by the device. The body 10 has end walls 11 which are fastened to body 10 in any convenient manner for example by crimping therein.

Situated between the end walls 11 are a plurality of wire engaging members 12 which are elongate and have a shape which is complementary to the internal shape of the cavity 14 within body 10. The wire engaging ends of members 12 have wire engaging surfaces which are formed by a curved recess 15 which is of a radius similar to that of the wire W. Members 12 are basically situated parallel to one another and are spaced apart by resilient spacer members 16. These spacer members 16 are of a suitable resilient material such as natural or synthetic rubber, foamed natural or synthetic rubber, resilient plastics material or foamed resilient plastics material. A spacer 16 is situated between the end walls 11 and the adjacent wire engaging members 12.

In use a wire is inserted through opening 17 in one end wall 11 and pushed through cavity 14 so as to project from the opening 17 in the other end wall 11. In the arrangement shown in FIG. 1 the movement of the wire W is shown by arrow A. During this movement the wire engaging members 12 incline away from the advancing wire so that free passage of the wire between recesses 15 and curved wall surface of cavity 14 is permitted. If, however, the wire is pulled in the direction of arrow B the wire engaging members 12 become wedged between wire W and the upper wall surface of cavity 14 so gripping the wire W between recesses 15 and lower curved wall surface of cavity 14. The wire W is thus firmly gripped by the device meaning that substantial force can be applied in the direction of arrow B without the wire W slipping through body 10.

Body 10 can be provided with means (not shown) whereby the body can be clamped to a fixture such as for example a post. Accordingly the body 10 can be placed in position and a wire W inserted therein and strained in the direction of arrow A until the required strain has been achieved. Release of the pulling force on wire W would mean that normally it would move in a direction of arrow B but this is prevented by the clamping force set up between wire engaging members 12 and the wall surface of cavity 14.

When two wires are to be joined together an arrangement such as illustrated in FIG. 5 can be employed. In this arrangement the body 10 is formed with two cavities 14 and as can be seen from FIG. 5 the resultant device is basically a pair of the devices as shown in FIGS. 1 to 4 but coupled side by side.

A further form of the invention is shown in FIGS. 6 to 8 where in a pair of wires can be joined together. The device is constructed in the same manner as previously disclosed except that the wire engagement members have a circular recess 15 formed at each end thereof. Once again the wire engaging members are so shaped that they may slide within cavity 14 but are not permitted to rotate therein.

Referring to FIG. 9 of the drawings yet a further form of the invention is shown. In this form wire engaging members 12 have a flat wire engaging surface 15' rather than the recess 15 of the previously disclosed forms. As shown in FIG. 10 the wire engaging surface 15' is so formed as to provide a serrated or other gripping surface. As shown the preferred form is provided by a number of parallel longitudinal sharp ridges 17.

Wires W are inserted into opposite ends of body 10 in a manner shown in FIG. 6. During movement in the directions indicated by arrows A the wires are free to move through the body due to the inclined positions taken up by the wire engaging members 12. When a pulling force is applied to one or other of the wires in the direction of arrow B the wire engaging members tend to incline in the opposite direction and thus wedge the two wires W between the respective circular recesses 15, or in the form of FIGS. 9 and 10 the flat surface 15', and curved wall surfaces of the cavity 14. The two wires can thus be strained to the required amount of strain and then released whereby they will be wedgedly retained within body 10.

It will be appreciated that the wire(s) W can be inserted into body 10 in either direction as the spacer members 16 will allow the wire engaging members 12 to tilt away in the direction of movement of the wire and so permit the wire to freely move through the body. Reverse movement of the wire will result in the wedging action set up by wire engaging members 12 to take place. Once a wire is engaged within the body it will be retained in position until the wire is once more pulled in the direction of arrow A. The device can thus be removed from a wire by pulling the wire in the direction of arrow A until it becomes clear of the body.

The invention thus provides a device which can be quickly and conveniently placed on a wire and will automatically grip the wire when said wire is pulled in a direction which is the reverse of which the wire was inserted into the body. The device can provide a means of anchoring a wire to a fixture or else for joining the ends of two wires.

What is claimed is:

1. A wire gripping device comprising a body, an internal cavity within said body, an opening into said cavity whereby a portion of a wire member can locate within said cavity, a plurality of wire engaging members located within said cavity, said wire engaging members being flat elongated members having a wire engaging surface, the wire engaging members being located in a parallel spaced-apart array by a resilient spacer member located between and coupling each pair of adjacent engaging members, the engaging member at each end of the array being coupled to a wall surface of said cavity by a said resilient spacer member, the wire engaging surfaces of the engaging members being located adjacent to but spaced from a fixed surface such that a wire member can be moved longitudinally into said cavity in one direction but is prevented from being removed by said engaging members wedging the wire member between the engaging surfaces thereof and said fixed surface.

2. The device according to claim 1 wherein the wire engaging surface is formed by the edge of one short side of the elongate wire engaging member.

3. The device according to claim 2 wherein said wire engaging surface is flat and has one or more longitudinal ridges thereon.

4. The device according to claim 2 wherein said wire engaging surface is a curved recess and is located opposite the said fixed surface which is of curved cross section.

5. The device according to claim 3 or 4 wherein a wire engaging surface is formed at each short side of the elongate wire engaging member.

6. The device according to claim 2 wherein the cross sectional shape of the cavity is substantially the same as that of the elongate members.

7. The device according to claim 6 wherein the resilient spacer members are formed from a rubber or plastics material.

8. The device according to claim 6 or 7 wherein the cavity is elongate with a longitudinal portion of the wall surface thereof forming said fixed surface, at least one of the end walls of said cavity having an opening aligned with the wire receiving space defined between the fixed wall and the wire engaging surfaces of the wire engaging members.

9. The device according to claim 8 wherein a said opening is formed in each end wall.

10. The device according to claim 8 wherein each resilient spacer member is of disc shape and is adhered to the face surface of the elongate member.

11. The device according to claim 8 wherein the body includes two cavities located side by side, each of said cavities having a said spacial array of the wire engaging members.

* * * * *